US007967986B2

(12) United States Patent
Mattiasson et al.

(10) Patent No.: US 7,967,986 B2
(45) Date of Patent: Jun. 28, 2011

(54) PROCESS FOR ABSORPTION-BASED SEPARATION OF BIOPARTICLES FROM AN AQUEOUS SUSPENSION

(75) Inventors: Bo Mattiasson, Hjärup (SE); Igor Galaev, Lund (SE); Ashok Kumar, Lund (SE); Maria Dainiak, Kävlinge (SE)

(73) Assignee: Protista Biotechnology AB, Bjuv (SE)

( * ) Notice: Subject to any disclaimer, the term of this patent is extended or adjusted under 35 U.S.C. 154(b) by 464 days.

(21) Appl. No.: 11/920,256

(22) PCT Filed: May 11, 2006

(86) PCT No.: PCT/SE2006/000556
§ 371 (c)(1),
(2), (4) Date: Jan. 21, 2009

(87) PCT Pub. No.: WO2006/121396
PCT Pub. Date: Nov. 16, 2006

(65) Prior Publication Data
US 2009/0200232 A1    Aug. 13, 2009

(30) Foreign Application Priority Data

May 13, 2005   (SE) ...................... 0501088

(51) Int. Cl.
*B01D 15/08*    (2006.01)
(52) U.S. Cl. ...................... 210/635; 210/656; 210/198.2; 210/502.1
(58) Field of Classification Search ................ 210/635, 210/656, 659, 198.2, 502.1
See application file for complete search history.

(56) References Cited

U.S. PATENT DOCUMENTS

| 2002/0166816 A1* | 11/2002 | Allen et al. ................ 210/656 |
| 2007/0163960 A1* | 7/2007 | Mattiasson et al. ........... 210/656 |
| 2009/0170973 A1* | 7/2009 | Mattiasson et al. ........... 521/134 |

FOREIGN PATENT DOCUMENTS

| WO | WO 91/17830 | 11/1991 |
| WO | WO 2004/087285 A1 | 10/2004 |

OTHER PUBLICATIONS

Dainiak PNAS Jan. 24, 2006, vol. 103 No. 4, pp. 849-854.*
International Preliminary Report on Patentability and Written Opinion of the International Search Report, issued in International Patent Application No. PCT/SE2006/000556m dated on Nov. 22, 2007.
Lozinsky et al. "The potential of polymeric cryogels in bioseparation", Bioseparation 10: 163-188, 2002.

* cited by examiner

*Primary Examiner* — Ernest G Therkorn
(74) *Attorney, Agent, or Firm* — Morrison & Foerster LLP

(57) ABSTRACT

A process for adsorption-based separation of bioparticles from an aqueous suspension containing such bioparticles is disclosed which process comprises
a) bringing said aqueous suspension into contact with a macroporous cryogel monolith carrying on its surface a ligand capable of interacting specifically or non-specifically with a receptor on the surface of a bioparticle to be separated to adsorb said bioparticle to said macroporous cryogen monolith; and
b) liberating said bioparticle from said macroporous cryogel monolith by elution, wherein said macroporous cryogel monolith is subjected to a physical deformation in conjunction with exposure to eluting medium.

6 Claims, No Drawings

PROCESS FOR ABSORPTION-BASED SEPARATION OF BIOPARTICLES FROM AN AQUEOUS SUSPENSION

RELATED APPLICATIONS

This application is the U.S. National Phase under 35 U.S.C. §371 of International Application No. PCT/SE2006/000556, filed on May 11, 2006, which in turn claims the benefit of Swedish Application No. 0501088-9, filed on May 13, 2005, the disclosures of which Applications are incorporated by reference herein.

TECHNICAL FIELD

The present invention relates to a process for adsorption-based separation of bioparticles from an aqueous suspension containing such bioparticles.

BACKGROUND ART

Interactions between bioparticles (bacterium, organelle, cell, virus) occurring throughout biology and the adsorption of cells to surfaces in affinity-based separations have a polyvalent nature. Poly- or multivalent interactions are characterized by the simultaneous binding of multiple receptors on the surface of bioparticle to multiple ligands on another surface and can be collectively much stronger than corresponding monovalent interactions.

The difficulty of disrupting multivalent interactions is one of the main problems in designing affinity techniques for cell separation. Theoretical studies have shown that for situations where the number of interactions is >10 it is unlikely that reasonable concentrations of a soluble monovalent competitor (biospecific eluent) can displace the binding equilibrium. Under typical chromatographic conditions ($10^{10}$-$10^{12}$ of ligands and receptors per $cm^2$ and $10^{-10}$-$10^{-8}$ $cm^2$ of contact area) the number of specific binding interactions can be between 1 and 10,000. Thus, in most cases an external force is required to simultaneously disrupt multiple bonds and detach specifically adsorbed cells. While leading to cooperative effect, retention of cells on affinity surface correlates with the affinity of individual receptor-ligand binding and the concentration of surface ligand and is sensitive to the presence of competitive binding inhibitors that reduce the force needed to remove attached cells. In approaches currently used for cell release the detachment forces are generated by the passage of air-liquid interfaces (X. Cao, R. Eisenthal, J. Hubble, Detachment strategies for affinity-adsorbed cells, Enzyme. Microbial. Technol. 31 (2002) 153-160; C. Gomez-Suarez, H. J. Busscher, H. C. Van der Mei, Analysis of bacterial detachment from substratum surfaces by the passage of air-liquid interfaces, Appl. Environ. Microbiol. 67 (2001) 2531-2537) or by using flow-induced shear forces (F. Ming, W. J. D. Whish, J. Hubble, Estimation of parameters for cell-surface interactions: Maximum binding force and detachment constant, Enzym. Microb. Technol. 22 (1998) 94-99; C. Cozens-Roberts, J. A. Quinn, D. A. Lauffenburger, Receptor mediated cell attachment and detachment kinetics. II. Experiments model studies with the radial flow detachment assay, Biophys. J. 58 (1990) 857-872). The latter leads to a high degree of dilution of eluted cells and involves the risk of cell damage.

Due to high heterogeneity of cell surface there can be other factors (e.g. hydrophobic and electrostatic interactions, van der Waals attraction) along with affinity interactions that control cell behavior at cell-surface interfaces and must be taken into account when designing affinity adsorbent for cell separations. Until recently, studies of cell adhesion have been focused mainly on cellular response to surface chemistry and topography, on microbial adherence to stiff supports such as polystyrene, teflon and glass. In biological systems cells often come into contact with soft surfaces, e.g. tissues or extracellular matrix that can undergo changes in elasticity (e.g. wound healing). However, only recently systematic studies of the effect of substrate mechanics on cell adhesion has been carried out and softness and elasticity of the surface were shown to be important parameters modulating cell-surface interactions (M. T. Madigan, J. M. Martinko, J. Parker, Brock Biology of Microorganisms. 9-th ed. Upper Saddle River, N.J., USA: Prentice-Hall, Inc., 2000; R. J. Pelham, Y. L. Wang, Cell locomotion and focal adhesions are regulated by substrate flexibility, Proc. Natl. Acad. Sci. USA 94 (1997) 13661-13665; J. Y. Wong, J. B. Leach, X. Q. Brown, Balance of chemistry, topography, and mechanics at the cell-biomaterial interface: Issues and challenges for assessing the role of substrate mechanics on cell response, Surf. Sci. 570 (2004) 119-133.). For example, investigations of the relationship between different types of cells and elasticity of polyacrylamide and alginate-based surfaces have revealed some common changes in cell behavior following a decrease of substrate stiffness, i.e. reduction of a cell spreading and weakening of cell-surface interactions (R. J. Pelham, Y. L. Wang, Cell locomotion and focal adhesions are regulated by substrate flexibility, Proc. Natl. Acad. Sci. USA 94 (1997) 13661-13665; A. Engler, L. Bacakova, C. Newman, A. Hategan, M. Griffin, D. Discher, Substrate compliance versus ligand density in cell on gel responses, Biophys. J. 86 (2004) 617-628; N. G. Genes, J. A. Rowley, D. J. Mooney, L. J. Bonassar. Effect of substrate mechanics on chondrocyte adhesion to modified alginate surfaces, Arch. Biochem. Biophys. 422 (2004) 161-167). Interestingly, these trends are independent of the adhesive ligand. An important implication of such dependence of cell behavior on the mechanics of adsorbent is that the use of soft materials in cell affinity separations may help to avoid or to decrease non-specific cell-surface interactions.

Polyacrylamide-based cryogel monoliths have recently been developed for the applications in bioseparations [V. I. Lozinsky, F. M. Plieva, I. Yu. Galaev, B. Mattiasson, The potential of polymeric cryogels in bioseparation, Bioseparation 10 (2002) 163-188. I. Yu. Galaev, M. B. Dainiak, F. M. Plieva, R. Hatti-Kaul, B. Mattiasson, High throughput screening of particulate-containing samples using super-macro-porous elastic monoliths in microtiter (multiwell) plate format, J. Chromatogr. A 1065 (2005) 169-175.] and are characterized by high porosity and elasticity. Due to the size (10-100 μm) and interconnected structure of the pores and the absence of non-specific interactions with the adsorbent cells pass freely through plain cryogels without affinity ligands [P. Arvidsson, F. M. Plieva, I. N. Savina, V. I. Lozinsky, S. Fexby, L. Bulow, I. Yu. Galaev, B. Mattiasson, Chromatography of microbial cells using continuous supermacroporous affinity and ion-exchange columns, J. Chromatogr. A 977 (2002) 27-38; A. Kumar, F. M. Plieva, I. Yu. Galaev, B. Mattiasson, Affinity fractionation of lymphocytes using supermacro-porous monolithic cryogel, J. Immunol. Methods 283 (2003) 185-194]. Unlike traditional polyacrylamide gels that are rather brittle, polyacrylamide-based cryogels are elastic soft sponge-like materials that can be easily compressed without being mechanically damaged. Due to capillary forces the monoliths retain the liquid inside them and are drainage-protected. As a consequence thereof the effectiveness (calculated as recovered cells in % of totally adsorbed cells) in the liberation of material adsorbed to a polyacrylamide-based cryogel carrying on its surface a ligand capable of interacting specifically or non-specifically with a receptor on the surface of a bioparticle to be separated by elution was found by the present inventors to be low even when applying flow-induced shear forces in order to increase the effectiveness of the elution step.

For that reason the object of the present invention is to provide a process which enables an improved effectiveness in the liberation of adsorbed material to be obtained when eluting bioparticles adsorbed to a macroporous cryogel monolith.

DESCRIPTION OF THE INVENTION

The present invention is based on the surprising finding that the release of bioparticles adsorbed to a macroporous cryogel monolith is substantially improved by subjecting said macroporous cryogel monolith to a physical deformation in conjunction with exposure to eluting medium.

Accordingly the present invention relates to a process for adsorption-based separation of bioparticles from an aqueous suspension containing such bioparticles which process comprises
a) bringing said aqueous suspension into contact with a macroporous cryogel monolith carrying on its surface a ligand capable of interacting specifically or non-specifically with a receptor on the surface of a bioparticle to be separated to adsorb said bioparticle to said macroporous cryogel monolith; and
b) liberating said bioparticle from said macroporous cryogel monolith by elution, wherein said macroporous cryogel monolith is subjected to a physical deformation in conjunction with exposure to eluting medium. Preferably, said physical deformation is brought about by compressing the macroporous cryogel during said elution.

Macroporous cryogels which may be used in the process according to the invention and processes for their preparation have been described, e.g. in WO 03/041830 A2 and WO 03/031014 A1 and processes for the preparation of macroporous cryogels in the form of monoliths has been described e.g. in WO 2004/087285 A1, the disclosures of which references are incorporated herein in their entirety by reference.

Polyacrylamide-based cryogel monoliths are also commercially available from Protista Biotechnology AB, Lund, Sweden.

The macroporous cryogel monolith to be used in the process according to the invention is preferably a polyacrylamide cryogel monolith carrying a ligand on its surface.

Methods of modifying cryogels by introducing one or more ligands thereinto are known from literature, e.g. from WO 03/041830 A2 mentioned above.

Examples of ligands which may be used in connection with the process according to the present invention includes, but are not limited to ion-exchange groups, immobilized metal affinity ligands, protein ligands (like lectines such as Concanavalin A (ConA)), immunoglobulin binding proteins (such as protein A), antibodies, antigens, receptors, synthetic ligands, modified peptide or protein ligands, nucleic acids, etc.

In accordance with the present invention the bioparticle to be separated from the aqueous suspension by means of the process according to the invention may be selected from the group consisting of mammalian cells, bacteria, cell organelles, viruses, inclusion bodies, latex particles, aerosols, particles of organic or inorganic composition or composites of the two, with dimensions in the range nano- to micrometers.

Depending on the specific material of macroporous cryogel monolith used the volume of said monolith may be reduced to different maximum degrees when being subjected to a physical deformation in accordance with the process of the present invention. In principle the macroporous cryogel monolith should be compressed to the maximum degree possible in connection with the equipment used in each specific case. Generally the macroporous cryogel monolith should be compressed to a volume of less than 25-30% of its original volume, preferably to a volume of less than 20% of its original volume and most preferably (when practically possible) to a volume of less than 1% of its original volume in the presence of an eluting solution.

WO 91/17830 A1 discloses the use of compression in order to remove excess buffer and later on in the chromatographic run in order to collect the elution buffer from a sponge adsorbent. However, in this case squeezing of the sponge does not improve elution efficiency. Squeezing was used exceptionally for improving liquid handling, i.e., for decreasing the dead volume in the matrix and hence obtaining the eluted soluble proteins in less volume. In this prior art process squeezing of the sponge absorbent in the absence of the eluent does not result in the elution of bound proteins. In fact, this allowed the use of squeezing at the washing state without a risk of loosing bound proteins.

In case of the present invention, on the other hand, squeezing is used as a main driving force of the elution of bound bioparticles. The bioparticles can be released from the cryogel monoliths by squeezing even in the absence of the eluent. However, squeezing in the presence of the eluent makes the release of bound particles even more efficient. Thus, squeezing of cryogel adsorbents with specifically bound bioparticles according to the process according to the present invention not only improved liquid handling as might be expected from WO 91/17830 A1 but also unexpectedly resulted in the improved elution of bound particles.

The invention will now be further illustrated by means of a number of specific examples which should not be construed as limiting the scope of the invention. Of the examples which follow Preparatory examples A to D relate to the preparation of macroporous hydrogel monoliths to be used in the process of the invention whereas Examples 1 to 4 illustrate the process according to the invention Preparatory Example A Production of Epoxy-Containing Polyacrylamide (polyAAm) Cryogel Monoliths Two types of epoxy activated polyAAm cryogel monoliths were produced using 5 and 6% solutions of co-monomers in the reaction mixture. Acrylamide (1.21 or 1.01 g), N,N'-methylene-bis(acrylamide)(0.43 or 0.36 g) and allyl glycidyl ether (0.170 or 0.142 ml) were dissolved in 30 ml of deionized water. The mixture was degassed under vacuum for 10 min to eliminate dissolved oxygen. Free radical polymerization was initiated by adding N,N,N',N'-tetramethylethylenediamine (21 or 18 µl) and ammonium persulfate (APS, 18 or 15 mg) and the reaction mixture was stirred gently for 20 seconds (the mixture was cooled in an ice bath for 15 min prior to addition of APS). Then, 0.5 ml of the reaction mixture was quickly added into glass tubes (39×7.1 mm I.D.) closed at the bottom with silicon caps. Glass tubes had an inner diameter slightly larger than that of a standard microtiter plate well. The solution was frozen within 30 min in the ARCTEST cooling chamber at −12° C., kept frozen at −12° C. over night and then thawed at room temperature. Silicon caps were removed and cryogel monoliths were washed thoroughly with deionized water.

Preparatory Example B

I. Preparation of Cryogel Monoliths with Immobilized Metal Affinity Chromatographic (IMAC) Ligands Epoxy-activated cryogel monoliths (16 plugs) prepared according to Preparatory Example A were washed with 0.5 M $Na_2CO_3$, equilibrated with 0.5 M iminodiacetic acid (IDA) in 1.0 M $Na_2CO_3$, pH 10.0 and were incubated in 30 ml of this solution for 24 hours at room temperature and gentle shaking. IDA-cryogel monoliths were placed into the wells of a 96-well plate with drilled holes (0.3 cm diameter) at the bottom of each well and were washed with water until pH became neutral. Cu(II) and Ni (II) ions were bound to the IDA-cryogel monoliths by passing 2 ml of 0.25 M $CuSO_4$ or $NiCl_2$ respectively, through each well. Finally, each well was washed with water and IDA-cryogel monoliths were equilibrated with 20 mM HEPES containing 0.2 M NaCl pH 7.0.

II. Determination of Ligand Density on Cryogel Monoliths

The amount of immobilized IDA was determined by assaying the amount of bound Ni (II) ions as follows: 2 ml of 25 mM $NiCl_2$ and 2 ml of deionized water were passed through IDA cryogel monoliths from I. above. The amounts of Ni (II) ions in the applied $NiCl_2$ solution and in the effluent were determined using Dr. Lange kit (Dr. Bruno Lange GmbH, Germany). The samples were diluted 1:1000 with deionized water prior to the analysis. The amount of bound Ni (II) was calculated as a difference between the amounts of applied and non-bound Ni (II).

Preparatory Example C

I. Preparation of ConA-Cryogel Monoliths

Epoxy-activated cryogel monoliths prepared according to Preparatory Example A were equilibrated with a solution of concanavalin A (ConA) (2 mg/ml) in 0.05 M carbonate buffer pH 9.0 containing 1 M NaCl, 1 mM $CaCl_2$, 1 mM $MgCl_2$ and incubated with a fresh solution of ConA for 24 hours at room temperature and gentle shaking. Non-reacted epoxy groups were blocked by incubating cryogel monoliths with 0.1 M ethanolamine in 0.05 M carbonate buffer pH 9.0 containing 1 M NaCl, 1 mM $CaCl_2$, 1 mM $MgCl_2$ for 2 hours at room temperature and gentle shaking. ConA-cryogel monoliths were placed into the wells of a 96-well plate with holes of 0.3 cm diameter drilled at the bottom of each well and were washed with 0.1 M acetate buffer pH 6.5 containing 0.5 M NaCl, 1 mM $CaCl_2$, 1 mM $MgCl_2$.

II. Determination of Ligand Density on Cryogel Monoliths

The amount of ConA immobilized on cryogel monoliths was determined by modified bicinchoninic acid assay [A. Kumar, F. M. Plieva, I. Yu. Galaev, B. Mattiasson, Affinity fractionation of lymphocytes using supermacroporous monolithic cryogel, J. Immunol. Methods 283 (2003) 185-194]. Fifteen mg of dried and finely ground ConA-cryogel monoliths were suspended in 400 µl of deionized water. To 50 and 100 µl of Con A-cryogel suspensions was added 2 ml of the bicinchoninic acid (BCA) solution and the mixture was incubated with thorough shaking for 2 hours at room temperature. A standard curve was made using quantitative additions on ConA to 50 and 100 µl of suspensions of finely ground native cryogel monolith (15 mg of ground powder in 400 µl deionized water). The absorbance was measured at 562 nm both with and without centrifuging the samples.

Preparatory Example D

Preparation of Protein A-Cryogel Monoliths

Epoxy-activated cryogel monoliths prepared according to Preparatory example A were equilibrated with 0.5 M ethylenediamine in 0.2 M $Na_2CO_3$ and incubated with a fresh portion of this solution overnight at room temperature and gentle shaking. After washing with water and 0.1 M sodium phosphate buffer, pH 7.2, Cryogel monoliths were equilibrated with glutaraldehyde solution (5% v/v) in the same buffer and incubated with a fresh portion of this solution for 5 h at room temperature and gentle shaking. The derivatized cryogel monoliths with functional aldehyde groups were equilibrated with protein A solution (2 mg/ml in 0.1 M sodium phosphate buffer, pH 7.2) and incubated with a fresh portion of this solution for 48 h at 4° C. at gentle shaking. Finally, cryogel monoliths were incubated with 30 ml of freshly prepared $NaBH_4$ solution (0.1 M in sodium carbonate buffer, pH 9.2) for 3 h at gentle shaking to reduce Schiff's base formed between the protein and the aldehyde-containing matrix.

The amount of protein A immobilized on cryogel monoliths was determined by modified bicinchoninic acid assay [A. Kumar, F. M. Plieva, I. Yu. Galaev, B. Mattiasson, Affinity fractionation of lymphocytes using supermacro-porous monolithic cryogel, J. Immunol. Methods 283 (2003) 185-194]. Fifteen mg of dried and finely ground protein protein A-cryogel monoliths were suspended in 400 µl of deionized water. To 50 and 100 µl of protein A-cryogel suspensions was added 2 ml of the bicinchoninic acid (BCA) solution and the mixture was incubated with thorough shaking for 2 hours at room temperature. A standard curve was made using quantitative additions of protein A to 50 and 100 µl of suspensions of finely ground native cryogel monolith (15 mg of ground powder in 400 µl deionized water). The absorbance was measured at 562 nm both with and without centrifuging the samples.

Example 1

Binding and Recovery of Yeast Cells and Latex Particles Using Affinity Cryogel Monoliths Aliquots (200 µl) of suspensions of yeast cells (bakers yeast from a local supplier)($DD_{600}$=1.03) and poly(N-vinyl imidazole-co-N-isopropylacrylamide) (poly(VI-NIPAM)) latex particles ($OD_{450}$=0.674) were applied to ConA-cryogel monoliths (prepared according to Preparatory example C and Cu(II)-IDA-cryogel monoliths (prepared according Preparatory example B)(0.5 ml adsorbent prepared using 6% solution of co-monomers) equilibrated with 0.1 M Tris-HCl, 150 mM NaCl, 5 mM $CaCl_2$ and 5 mM $MgCl_2$ pH 7.4 and 20 mM HEPES, 0.2 M NaCl pH 7.0 respectively. After the incubation for different periods of time with the applied particles, affinity cryogel monoliths were washed with 12 column volumes of corresponding running buffer at a flow velocity of 21 cm/h to remove non-bound particles. Amount of bound particles was calculated as a difference between the amounts of particles in the applied suspensions and in the flow-through fractions.

For this experiment affinity cryogel monoliths (0.5 ml; rods 12.5×7.1 mm diameter) were placed into a column (7×20 mm I.D) connected to a pump. New affinity cryogel monoliths were used in each test.

As is shown by Table 1 below, an incubation with ConA-cryogel monolith was required for efficient capture of yeast cells while the amount of poly(VI-NIPAM) latexes bound to Cu(II)-IDA-cryogel monolith was independent on the time of contact between the applied particles and the adsorbent. An increase in the amount of yeast cells or latexes applied on ConA- or Cu(II)-IDA-cryogel monoliths did not lead to an increased binding, the excess of applied particles was in the flow-through (data not shown).

Two different strategies were employed for the release of bound particles: application of shear forces by passing subsequently pulses of buffer and a corresponding eluent (1.5 ml of α-D-manno-pyroside (or glucose) in case of yeast cells and EDTA (or imidazole) in case of latex particles) at a velocity of 430 cm/h (flow-induced detachment) and by mechanical compression (squeezing) of cryogel monoliths. The duration of the pulses of buffer and eluent during the flow-induced detachment was optimized and the next detachment step was applied when no more cells could be recovered by the previous step. After the flow-induced detachment step the column was disconnected from a pump and the monolithic adsorbent was compressed with a glass rod, re-swollen by adding new portion (0.5 ml) of the eluent and compressed once again. The squeezed out liquid (total volume 0.70-0.75 ml) was collected and analyzed by turbidity measurements (absorbance at 600 or 450 nm).

The time of contact of yeast cells within ConA-cryogel monolith preceding the wash step had a pronounced effect on the strength of interaction and as a result, on the efficiency of flow-induced detachment (Table 1). In the test performed without the incubation step, 29% and 36% of captured yeast cells were detached by applied flow without and in the presence of 0.3 M α-D-manno-pyranoside, respectively. In the test in which cells were incubated for 30 min within the affinity adsorbent only 9% of bound cells were released by the first pulse and 9% by applied shear in presence of specific eluent. The results show that there are several fractions of captured yeast cells characterized by different binding strengths to the affinity matrix. The fraction of strongly bound cells that can not be detached by elevated flow rates is getting larger with the increase in contact time between the cells and affinity adsorbent. A time dependent effect on the strength of interaction between yeast cells and ConA-coated surface was also observed by Lam et al. (A. Lam, X. Cao, R. Eisenthal, J. Hubble, Effect of contact time and inhibitor concentration on the affinity mediated adsorption of cells to surfaces, Enzym. Microb. Technol. 29 (2001)). The stabilization phenomenon has been explained by the possibility for further formation of bonds in the time dependent manner following the initial anchoring of the cell by affinity ligands on the surface (J. Hubble, Affinity cell separations: problems and prospects. Trends Biotechnol. 15 (1997) 249-255). It has been observed that there is a distribution of attachment strengths due to a distribution of the number of bonds formed between a population of cells and affinity surface (F. Ming, R. Eisenthal, W. J. D. Whish, J. Hubble, The kinetics of affinity-mediated cell-surface attachment, Enzym. Microb. Technol. 26 (2000) 216-221). Compression of ConA-cryogel monoliths containing the fraction of yeast cells that were not released by shear forces even in presence of specific eluent resulted in total recovery of that fraction of cells (Table 1).

The kinetics of interaction of poly(VI-NIPAM) latexes with Cu(II)-IDA-cryogel monoliths was fast and the strength of attachment was independent of contact time: not more than 12% of captured with or without pre-incubation step latexes came out from the column with a pulse of 0.3 M imidazole applied at a velocity of 430 cm/h (Table 1). About 60% of captured latex particles were detached by squeezing Cu(II)-IDA-cryogel monolith.

TABLE 1

Release of affinity-bound particles by flow induced detachment followed by mechanical compression (squeezing) of Cryogel monoliths.

| Particle/ligand | Incubation of particles within the adsorbent, min | Bound Particles, units $OD_{600;\ 450}$ | Particles released by flow-induced detachment using flow[a] (430 cm/h) of | | Particles released by squeezeing, % |
|---|---|---|---|---|---|
| | | | Running buffer, % | Eluent[b], % | |
| Yeast cells/ConA | | 0.070 | 29 | 36 | 35 |
| | 15 | 0.122 | 15 | 19 | 66 |
| | 30 | 0.112 | 9 | 9 | 82 |
| Poly(VI-NIPAM) latexes/Cu(II)-IDA | | 0.135 | 0 | 10 | 61 |
| | 15 | 0.125 | 0 | 12 | 57 |

[a]Duration of a pulse of flow was 1 min.
[b]Eluent: 0.3 M α-D-manno-pyranoside and 0.3 M imidazole in corresponding running buffers in the tests with cells/ConA and Poly(VI-NIPAM) latexes/Cu(II)-IDA, respectively.

The described above data demonstrate that mechanical compression of cryogel monolithic adsorbent results in disruption of multiple bonds between bound particles and the surface of affinity cryogel and in recovery of the detached particles with a flow of squeezed out liquid. It was previously demonstrated by scanning electron microscopy studies that cells captured by affinity cryogel monoliths are bound to the plain "flat" parts of the pore walls and are not entrapped in "dead flow" zones (P. Arvidsson, F. M. Plieva, I. N. Savina, V. I. Lozinsky, S. Fexby, L. Bulow, I. Yu. Galaev, B. Mattiasson, Chromatography of microbial cells using continuous supermacro-porous affinity and ion-exchange columns, J. Chromatogr. A 977 (2002) 27-38). The possible reasons for the disruption of affinity bonds can be the deformation of the plain surface or/and inactivation of affinity ligands caused by mechanical compression. The possibility of ligand inactivation was studied in the adsorption tests using affinity cryogel monoliths regenerated after the squeezing procedure (Table 2). In cycle I the suspensions of analyzed particles were applied to the corresponding affinity cryogel monoliths (yeast cells were incubated for 15 min within the adsorbent), non-bound particles were removed by washing and the monoliths were equilibrated with the eluent (0.3 M α-D-manno-pyranoside and 0.3 M imidazole in case of yeast cells and poly (VI-NIPAM) latexes, respectively). Bound particles were released by the squeezing procedure described previously. After the detachment step, the column was regenerated by washing with 12 column volumes of the corresponding running buffer and the cycle was repeated. The results shown by Table 2 demonstrate that the squeezing procedure did not have a pronounced effect on the binding properties of ConA- and Cu(II)-IDA-cryogel monoliths and on detachment efficiency in cycle II indicating that it is unlikely that mechanical compression performed in cycle I caused inactivation of the ligands. Thus, the main mechanisms involved in the squeezing-induced detachment of particle from the surface are probably the physical dislodging of cells by microscopic deformation of the surface carrying affinity ligands and the flow of squeezed out liquid. The presence of specific eluent in the pores of adsorbent may contribute to detachment by decreasing the equilibrium number of bonds and preventing reorientation and re-adsorption of detached particles on their way out from the column.

TABLE 2

Effect of squeezing on the performance of affinity cryogel monoliths.

| Particle/ligand | Cycle I | | Cycle II | |
|---|---|---|---|---|
| | Bound Particles, units $OD_{600; 450}{}^a$ | Particles detached by squeezing, $\%^b$ | Bound particles, units $OD_{600; 450}{}^a$ | Particles detached by squeezing, $\%^b$ |
| Yeast cells/ConA | 0.112 | 100 | 0.086 | 100 |
| Poly(VI-NIPAM) latexes/Cu(II)-IDA | 0.143 | 67 | 0.136 | 60 |

$^a$Units of $OD_{600}$ and $OD_{450}$ were used in the tests with yeast cells and poly(VI-NIPAM) latexes, respectively.
$^b$Amount of bound particles was taken as 100%.

Example 2

Binding and Recovery of Inclusion Bodies Using Protein A-Cryogel Monoliths

A 33 kD model protein fermented as inclusion bodies in recombinant E. coli and IgG anti A15 and anti B17 against the 15 amino acids on the amino end and 17 amino acids on the carboxylic end of the 33 kD target protein was used in this experiment. The inclusion body slurry was diluted 8 or 30 times in 50 mM PBS, pH 7.2 and 0.5 ml of diluted slurry was incubated with 40 µl of antibody solution (1.0 mg ml$^{-1}$) on ice for 15 minutes. The mixture was centrifuged at 10 000 g for 2 minutes, the pellet re-suspended in 0.5 ml of 50 mM PBS and centrifuged once more for 2 minutes. The pellet was re-suspended in 1 or 4 ml of 50 mM PBS pH 7.2 and the suspension (0.150-0.220 ml) was applied to Protein A-cryogel monoliths (prepared according to Preparatory example D) equilibrated with 50 mM PBS pH 7.2. The monoliths were incubated with the treated inclusion body suspension for 15 minutes and then washed with 2 ml of 50 mM PBS pH 7.2 to remove non-bound material. The recovery of bound inclusion bodies was carried out by squeezing Protein A-cryogel monoliths.

Example 3

I Preparation of E. coli Cell Homogenate

E. coli K12 strain with plasmid pLH2 encoding the hybrid LamB-His$_6$ monomers (His$_6$-E. coli) was used in this experiment. The E. coli K12 strain mentioned and E. coli TG1 strain producing His$_6$-LDH (E. coli TG1) were grown in Luria-Bertani (LB) medium (tryptone 10 g/l, yeast extract 5 g/l, NaCl 10 g/l) supplemented with 30 µg/ml chloramphenicol or 100 µg/ml ampicillin, respectively at 37° C. in a shaking incubator at 175 rpm. His$_6$-E. coli cells were harvested at middle log phase by centrifugation at 5800 g for 5 min. The cell pellet was kept on ice and suspended in 20 mM HEPES, 200 mM NaCl pH 7.0 prior to adsorption tests. The cells were used within 1-2 days after cultivation.

Expression of His$_6$-LDH was carried out as follows: when the optical density at 600 nm of E. coli TG1 cell culture (200 ml inoculated with 10 ml of overnight culture) reached 0.7, IPTG and another portion of ampicillin was added to a final concentration of 48 and 100 mg/l, respectively. After 3.5 hours the cells were harvested (5800 g for 5 min), re-suspended in 50 ml of 50 mM Tris-HCl pH 7.0 and sonicated. The obtained cell homogenate was divided into small fractions and stored at −20° C.

II Binding and Recovery of His$_6$-LDH Using Cu(II)-IDA-Cryogel Monoliths

E. coli cell homogenate (0.2 ml) containing His$_6$-LDH was applied to Cu(II)-IDA cryogel monoliths (prepared according to Preparatory example B) equilibrated with buffer (20 mM HEPES, 0.2 M NaCl pH 7.0. After incubation for 10 min Cu(II)-IDA-cryogel monoliths were washed with 3.5 ml of the buffer above to remove non-bound protein and cell debris.

Bound His$_6$-LDH was eluted with EDTA or imidazole in the buffer above. Squeezing of Cu(II)-IDA-cryogel monoliths was carried out as described previously. His$_6$-LDH was detected in the effluents and eluates by measuring enzyme specific activity. Recovery was determined as the percent of bound activity units that eluted in the purified pool.

The assay of LDH activity was performed in 0.2 M Tris-HCl buffer pH 7.3 containing 1.0 mM pyruvate and 0.225 mM β-nicotinamide adenine dinucleotide, reduced (NADH), by monitoring the absorbance decrease of NADH at 340 nm. One enzyme unit represents the reduction of 1 µmol of pyruvate per minute.

Example 4

The phenomenon of cell release by mechanical deformation of the affinity surface observed according to Example 1 above was further studied by analyzing effect of different parameters such as concentration and nature of specific eluent, density and affinity of binding groups at the surface of bioparticles, different size and geometry of the particles and rigidity of cryogel pore walls on the efficiency of the squeezing procedure. For this purpose, two types of cryogel monoliths ("soft" and "dense" monoliths prepared using 5 and 6% solutions of co-monomers, respectively) with various immobilized affinity ligands were inserted into the open-ended wells of a 96-well microtiter-plate modified with round openings (3 mm diameter) at the bottom of each cell. Cryogel monoliths used in this study have the size (12.5×7.1 mm diameter) that fit perfectly into the well (7 mm diameter) of a standard 96-well plate. Drainage protecting properties of cryogel monoliths make them suitable for the application in the multiwell format which provides possibilities for parallel analysis of a large number of samples.

In this set of experiments two additional model systems (namely those of Examples 2 and 3) were also studied in addition to those of Example 1.

The strategy of flow-induced detachment was not applicable in 96-well format. Therefore, detachment of bound particles was carried out by conventional elution, i.e. by passing 3 column volumes of the appropriate eluent through the wells (the liquid was applied on top of the cryogels with a multichannel pipette) or by squeezing the adsorbent equilibrated with different concentrations of the eluent. As expected, not more than 20 and 38% of yeast cells captured on ConA-cryogel monoliths were eluted with 0.3 M solutions of glucose and α-D-manno-pyranoside, respectively. Only 10-20% of captured $His_6$-E. coli cells were recovered from Ni (II)-IDA-cryogel monoliths by elution with 50 mM EDTA while, poly(VI-NIPAM)-latex particles could not detached at all by conventional elution even at high concentrations of EDTA. The fact that poly(VI-NIPAM) latexes do not interact with control plain cryogel-monoliths (data not shown) but latex particles captured on Cu(II)-IDA-Cryogel monoliths remain bound to the adsorbent after EDTA treatment which removes Cu(II) ions indicates that specific binding promotes further non-specific adhesion of microgel particles to the adsorbent.

40-80% of bound cells were detached by squeezing even in the absence of the eluent in the equilibration buffer. Manual compression with a glass rod takes about 1-2 seconds and results in squeezing of 365-375 µl of liquid. Thus detached cells get into the flow with high velocity that prevents a large fraction of cells from re-adsorption. The amount of released cells increased with the increase of the concentration of specific eluent in the running buffer. The rigidity of the pore walls and porosity of cryogel monoliths is another parameter influencing the efficiency of the recovery of cells by squeezing the matrix. The effect of squeezing was especially pronounced in case of "soft" (5%) cryogels monoliths which have higher porosity and elasticity as compared to "dense" (6%) cryogel monoliths. Practically all bound yeast cells and recombinant E. coli cells were released by squeezing "soft" ConA- and Ni (II)-IDA-cryogel monoliths in the presence of 10 mM α-D-manno-pyranoside and 3 mM EDTA, respectively. A quantitative release of yeast cell by squeezing was achieved in the presence of 40-60 mM glucose. Glucose is an eluent with a lower affinity to ConA ligands and therefore higher concentrations were required as compared to experiments with α-D-manno-pyranoside. Quantitative recovery of yeast cells by squeezing "dense" ConA-cryogel monoliths was observed at 0.5 M α-D-manno-pyranoside and only 80% were recovered in the presence of 0.7 M glucose. It is important to note that recombinant E. coli cells recovered by squeezing retained their viability and grew on chloramphenicol-containing agar plates.

The concentration of the eluent in the equilibration buffer affected the amount of microgel particles released by the squeezing. About 40% of latex particles remained bound to the adsorbent after the squeezing in the presence of 0.3 M imidazole or 20 mM EDTA. Further increase of the eluent concentration did not result in the increase in the amount of recovered latexes that could be due to non-specific interactions mentioned above. The density of the pore walls and porosity of the affinity cryogel monolith had less prominent effect on the efficiency of recovery of microgel particles by squeezing as compared to such recovery in the case of yeast and $His_6$-E. coli cells. The most pronounced effect of the structure of cryogel monolith on the squeezing was observed in case of the largest studied particles, i.e. yeast cells.

The binding between Protein A and a variety of mammalian IgG molecules is strong and harsh conditions such as pH in the range of 2.0-3.0 are commonly used for elution of IgG captured on Protein A adsorbents. Inclusion bodies labeled with specific antibodies anti A15 or anti B17 captured on Protein A-cryogel monoliths could be released by the squeezing procedure at pH 7.0. A stronger binding was observed in case of anti B17 labeled inclusion bodies. It is possible that anti A15 and anti B17 have different affinities to the antigen resulting in different densities of IgG on the surface of inclusion bodies. The lowest recovery yield was observed in case of inclusion bodies which were labelled in case of inclusion bodies which were labelled with IgG under different conditions, i.e. in the presence of higher amount of IgG. This suggests that the efficiency of the release of antiB17 labelled inclusion bodies was negatively effected by increasing number of the binding groups on the particle surface.

As a control experiment, effect of squeezing on the release of target macromolecules, $His_6$-LDH, captured via monovalent interactions on Cu(II)-IDA-cryogel monolith has been studied. Efficient desorption of protein from Cu(II)-IDA-cryogel monoliths was achieved by conventional mode of elution with 200-300 mM imidazole. Compressing of Cu(II)-IDA-cryogel monoliths did not result in any increase of recovery of bound protein, $His_6$-LDH, at any used concentration of imidazole.

The invention claimed is:

1. Process for adsorption-based separation of bioparticles from an aqueous suspension containing such bioparticles which process comprises
   a) bringing said aqueous suspension into contact with a macroporous cryogel monolith carrying on its surface a ligand capable of interacting specifically or non-specifically with a receptor on the surface of a bioparticle to be separated to adsorb said bioparticle to said macroporous cryogel monolith; and
   b) liberating said bioparticle from said macroporous cryogel monolith by elution, wherein said macroporous cryogel monolith is subjected to a physical deformation in conjunction with exposure to eluting medium.

2. Process according to claim 1, wherein said physical deformation is brought about by compressing the macroporous cryogel during said elution.

3. Process according to claim 1 or claim 2, wherein said macroporous cryogel monolith is a polyacrylamide cryogel monolith carrying a ligand on its surface.

4. Process according to claim 3, wherein said ligand is selected from the group consisting of ion-exchange groups, immobilized metal affinity ligands, protein ligands, immunoglobulin binding proteins, synthetic ligands or modified peptide- or protein ligands, nucleic acids etc.

5. Process according to claim 1 or claim 2, wherein the bioparticle to be separated from said aqueous suspension is selected from the group consisting of mammalian cells, bacteria, cell organelles, viruses, inclusion bodies, latex particles, aerosols, particles of organic or inorganic composition or composites of the two, with dimensions in the range nano- to micrometers.

6. Process according to claim 1 or claim 2, wherein the macroporous cryogel monolith is compressed to a volume less than 25-30% of its original volume, preferably to a volume of less than 20% of its original volume and most preferably to a volume of less than 1% of its original volume in the presence of an eluting solution.

* * * * *